United States Patent
Okamoto

(10) Patent No.: US 7,428,340 B2
(45) Date of Patent: Sep. 23, 2008

(54) WAVELET-BASED ENCODING METHOD AND WAVELET-BASED ENCODING DEVICE

(75) Inventor: Akira Okamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 948 days.

(21) Appl. No.: 10/826,291

(22) Filed: Apr. 19, 2004

(65) Prior Publication Data

US 2004/0197025 A1    Oct. 7, 2004

Related U.S. Application Data

(62) Division of application No. 09/314,961, filed on May 20, 1999, now Pat. No. 6,751,355.

(30) Foreign Application Priority Data

May 21, 1998   (JP) .............................. H10-139905

(51) Int. Cl.
    G06K 9/36   (2006.01)
(52) U.S. Cl. ..................................... 382/240; 382/232
(58) Field of Classification Search ................. 382/232, 382/240; 704/203, 220, E19.012, E19.02, 704/E19.026, 223
See application file for complete search history.

(56) References Cited

U.S. PATENT DOCUMENTS

| 5,162,923 | A | * | 11/1992 | Yoshida et al. | ............... | 382/248 |
| 5,745,392 | A | | 4/1998 | Ergas et al. | .................. | 708/203 |
| 5,825,935 | A | | 10/1998 | Murakoshi | ................... | 382/248 |
| 6,496,797 | B1 | * | 12/2002 | Redkov et al. | ............... | 704/220 |
| 6,751,355 | B1 | * | 6/2004 | Okamoto | ..................... | 382/240 |

FOREIGN PATENT DOCUMENTS

JP            07-079433 A        3/1995
JP            411330975      *   11/1999

* cited by examiner

*Primary Examiner*—Anh Hong Do
(74) *Attorney, Agent, or Firm*—Arent Fox LLP

(57) ABSTRACT

Input data, distributed along a time axis, is converted into data distributed along a frequency axis by the use of a frequency range dividing filter, and is subjected to scalar quantization performed by a compression circuit with different step numbers for different frequency ranges, so that data in a plurality of frequency ranges along the frequency axis is compressed.

8 Claims, 8 Drawing Sheets

| $d_{pq}(-1,-1)$ | $d_{pq}(0,-1)$ | $d_{pq}(1,-1)$ |
|---|---|---|
| $d_{pq}(-1,0)$ | $d_{pq}(0,0)$ | $d_{pq}(1,0)$ |
| $d_{pq}(-1,1)$ | $d_{pq}(0,1)$ | $d_{pq}(1,1)$ |

LARGE-CODE : { a, b, c, ..., o }
SUBCODE : { a, d, e, f, g }
{ b, h, i, j, k }
{ c, l, m, n, o }

WAVELET-BASED ENCODING METHOD AND WAVELET-BASED ENCODING DEVICE

This application is a DIV of Ser. No. 09/314,961, filed May 20, 1999, now U.S. Pat. No. 6,751,355.

BACKGROUND OF THE INVENTION

1. Field of the Invention

The present invention relates to a wavelet-based encoding method used, for example in an image processing apparatus, to compress image data that is to be held temporarily, and particularly to a wavelet-based encoding method suitable for still-image data.

2. Description of the Prior Art

According to a wavelet-based encoding method, image data is compressed in the following manner. First, the image data of each frame is divided into blocks each composed of a plurality of pixels. Next, each of the blocks thus obtained by division is divided into a plurality of frequency ranges by a frequency-range dividing filter, so that the image data, originally distributed along a time axis, is converted into data distributed along a frequency axis. Thereafter, the data is compressed by different methods appropriate for the individual frequency ranges, and is then encoded by a predetermined method.

The data divided into a plurality of frequency ranges is individually compressed in the following manner. In general, the higher the frequency, the less sensitive the human eye is to the variation of the amplitude. That is, the human eye is more sensitive to degradation of image quality in lower frequency ranges than in higher frequency ranges. Thus, it is advisable to use an encoding method that generates smaller quantization errors (i.e. that offers a low compression rate) for lower frequency ranges and use an encoding method that offers a high compression rate (i.e. that generates greater quantization errors) for higher frequency ranges. For example, DPCM (differential pulse code modulation) that generates no quantization errors is used for low frequency ranges, scalar quantization is used for intermediate frequency ranges (i.e. between low and high frequency ranges), and vector quantization is used for high frequency ranges.

Here, conventionally, for all of the frequency ranges that are to be subjected to scalar quantization, scalar quantization is performed with a uniform step number and with non-linear step widths that are so determined that the step width increases as the absolute value of the data increases. Moreover, for all of the frequency ranges that are to be subjected to vector quantization, vector quantization is performed in such a way that a set of mutually corresponding pieces of data throughout all of those frequency ranges is dealt with as a unit and by the use of a single code book; that is, always a fixed number of pieces of data is subjected to vector quantization using a fixed code book.

Here, data having a great absolute value does not occur frequently. This is why conventionally scalar quantization is performed using a wider step width according as the absolute value of data increases. However, data that does not occur frequently is exactly data that is conspicuous on the screen. Therefore, permitting greater quantization errors for such data leads to unacceptably large degradation of the decoded image.

On the other hand, for high frequency ranges, for which vector quantization is performed, always subjecting a fixed number of pieces of data to vector quantization using a fixed code book leads to unacceptably large degradation of the decoded image, depending on the type of the image, even though the human eye is less sensitive to degradation of image quality in high frequency ranges.

In addition, the frequency range dividing filter is realized by the use of a QMF (quadrature mirror filter), which is, as shown in FIG. 9, built as a common FIR (finite impulse response, i.e. non-recursive digital filter) composed of delay circuits (flip-flops) $FF_1, FF_2, \ldots$, multipliers $M_1, M_2, \ldots$, and an adder A, and thus requires a large circuit scale.

SUMMARY OF THE INVENTION

An object of the present invention is to provide a wavelet-based encoding method that makes it possible to reduce degradation of decoded data without unduly lowering the compression rate.

Another object of the present invention is to provide a wavelet-based encoding device that can be realized with a smaller circuit scale as a result of the use of a frequency range dividing filter having a unique configuration.

To achieve the above objects, according to a first feature of the present invention, in a wavelet-based encoding method that converts input data, distributed along a time axis, into data distributed along a frequency axis by using a frequency range dividing filter and that compresses the data distributed along the frequency axis by using methods corresponding to individual frequency ranges, data in a plurality of frequency ranges along the frequency axis is compressed by performing scalar quantization with step numbers varied from one frequency range to another. This method allows the use of greater step numbers than is customary for lower frequency ranges among a plurality of frequency ranges that are to be subjected to scalar quantization. This reduces deterioration of decoded data without unduly lowering the compression rate.

According to a second feature of the present invention, in a wavelet-based encoding method that converts input data, distributed along a time axis, into data distributed along a frequency axis by using a frequency range dividing filter and that compresses the data distributed along the frequency axis by using methods corresponding to individual frequency ranges, as long as an absolute value of data is within a threshold value, scalar quantization is performed with an increasingly wide step width according as the absolute value of data increases and, when the absolute value of data exceeds the threshold value, no quantization is performed, so that data in a particular frequency range along the frequency axis is compressed. This method eliminates quantization errors for data, within the frequency ranges that are to be subjected to scalar quantization, that has a greater absolute value than the threshold value. This reduces degradation of decoded data without unduly lowering the compression rate, in particular in cases where image data is dealt with, where data having a great absolute value does not occur frequently.

According to a third feature of the present invention, in a wavelet-based encoding method that converts input data, distributed along a time axis, into data distributed along a frequency axis by using a frequency range dividing filter and that compresses the data distributed along the frequency axis by using methods corresponding to individual frequency ranges, data in a particular frequency range along the frequency axis is compressed by performing vector quantization using a code book selected from among a plurality of code books according to activity of the input data.

According to a fourth feature of the present invention, in the wavelet-based encoding method as claimed in claim 3, for each of local regions each composed of a plurality of pieces of the input data, a local average value is calculated by calculating an average value of those pieces of data, then local activity is calculated by calculating an average of squares of deviations of those pieces of data from the local average, and then the activity of the input data is calculated by calculating an average of the local activity of all of the local regions. The methods according to the third and fourth features described above allow vector quantization to be performed according to the type of input data. This reduces quantization errors and thus degradation of decoded data.

According to a fifth feature of the present invention, in a wavelet-based encoding method that converts input data, distributed along a time axis, into data distributed along a frequency axis by using a frequency range dividing filter and that compresses the data distributed along the frequency axis by using methods corresponding to individual frequency ranges, wherein data in a particular frequency range along the frequency axis is compressed by performing vector quantization on quantization units varied according to quantization errors resulting from vector quantization. This method allows vector quantization to be performed with a smaller quantization unit only when quantization errors are great. This reduces degradation of decoded data without unduly lowering the compression rate.

According to a sixth feature of the present invention, in a wavelet-based encoding method that converts input data, distributed along a time axis, into data distributed along a frequency axis by using a frequency range dividing filter and that compresses the data distributed along the frequency axis by using methods corresponding to individual frequency ranges, data in a particular frequency range along the frequency axis is compressed by performing either vector quantization or scalar quantization according to quantization errors resulting from vector quantization. This method allows vector quantization to be used when quantization errors are relatively small and scalar quantization when quantization errors are relatively great. This reduces degradation of decoded data without unduly lowering the compression rate.

According to a seventh feature of the present invention, in a wavelet-based encoding device that converts input data, distributed along a time axis, into data distributed along a frequency axis by using a frequency range dividing filter and that compresses the data distributed along the frequency axis by using methods corresponding to individual frequency ranges, the frequency range dividing filter is composed of a plurality of non-recursive digital filters and performs a multiplication operation by exploiting a fact that a value is approximated by adding or subtracting a value obtained by shifting digits of another value. This configuration helps reduce the number of multipliers required in the frequency range dividing filter and thereby reduce the circuit scale.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
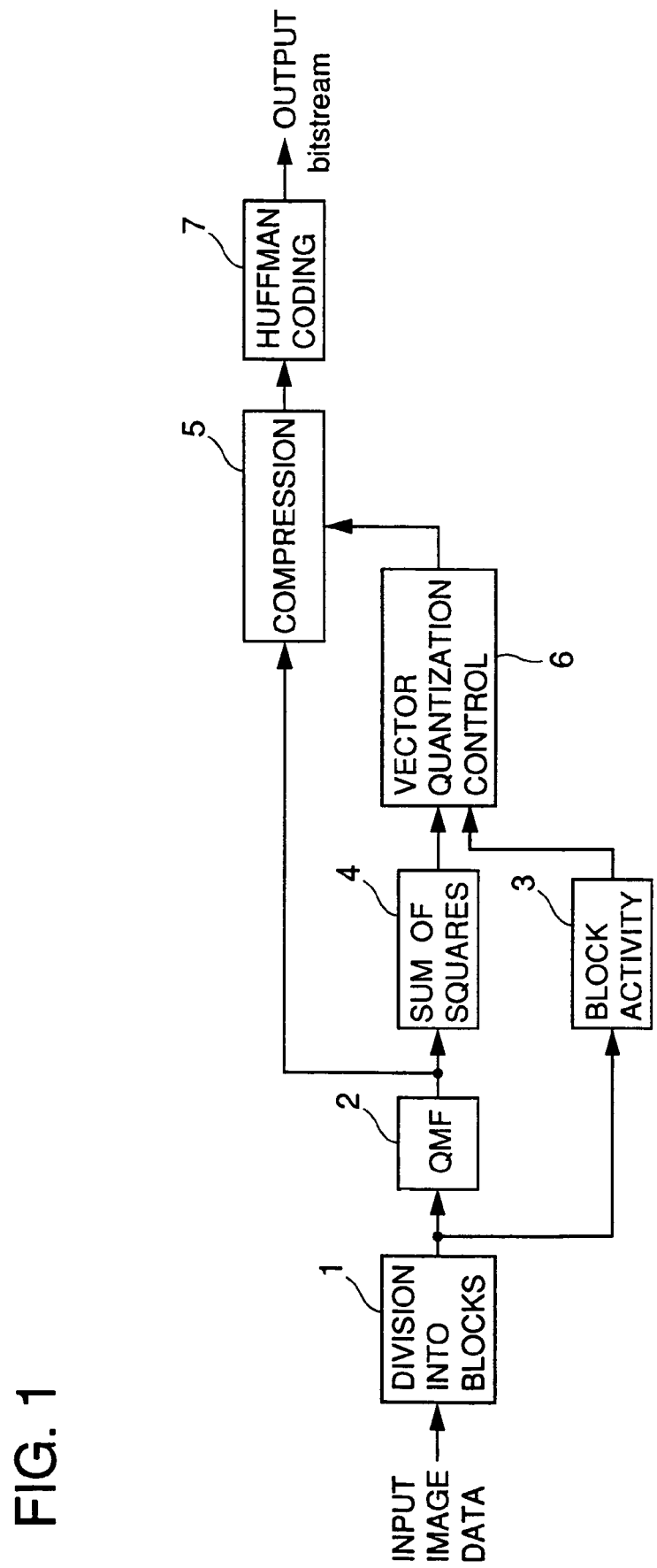
FIG. 1 is a block diagram of an example of a wavelet-based encoding device that compresses data by a wavelet-based encoding method according to the invention.

FIG. 1 shows a block diagram of an example of a wavelet-based encoding device that compresses image data by a wavelet-based encoding method according to the present invention. In FIG. 1, reference numeral 1 represents a block division circuit for dividing input image data into units called blocks each consisting of 16×16 pixels; reference numeral 2 represents a QMF for converting, block by block, the image data, distributed along a time axis, into data distributed along a frequency axis; reference numeral 3 represents a block activity calculation circuit for calculating the activity of the data divided into blocks by the block division circuit 1 (hereafter, the activity of a block will be referred to as "block activity"); reference numeral 4 represents a sum-of-squares calculation circuit for calculating the weighted sum of the squares of all pieces of data within the frequency ranges that are to be subjected to vector quantization (here, data in lower frequency ranges are given heavier weights); reference numeral 5 represents a compression circuit for compressing the data distributed along the frequency axis by methods appropriate for the individual frequency ranges; reference numeral 6 represents a vector quantization control circuit for controlling the operation of vector quantization performed by the compression circuit 5 according to the weighted sum of squares calculated by the sum-of-squares calculation circuit 4 and the block activity calculated by the block activity calculation circuit 3; reference numeral 7 represents a Huffman coding circuit for performing Huffman coding on the sequence of data resulting from the compression performed by the compression circuit 5.

In this configuration, wavelet-based encoding is achieved by the following procedure. The block division circuit 1 divides the luminance data of an input image into blocks each consisting of 16×16 pixels. The block activity calculation circuit 3 calculates the block activity $\sigma^2 d[b_n]$ of each block. Here, n represents the number of each block, and the block activity $\sigma^2 d[b_n]$ indicates how violently data varies within each block.

Figures 2A, 2B:
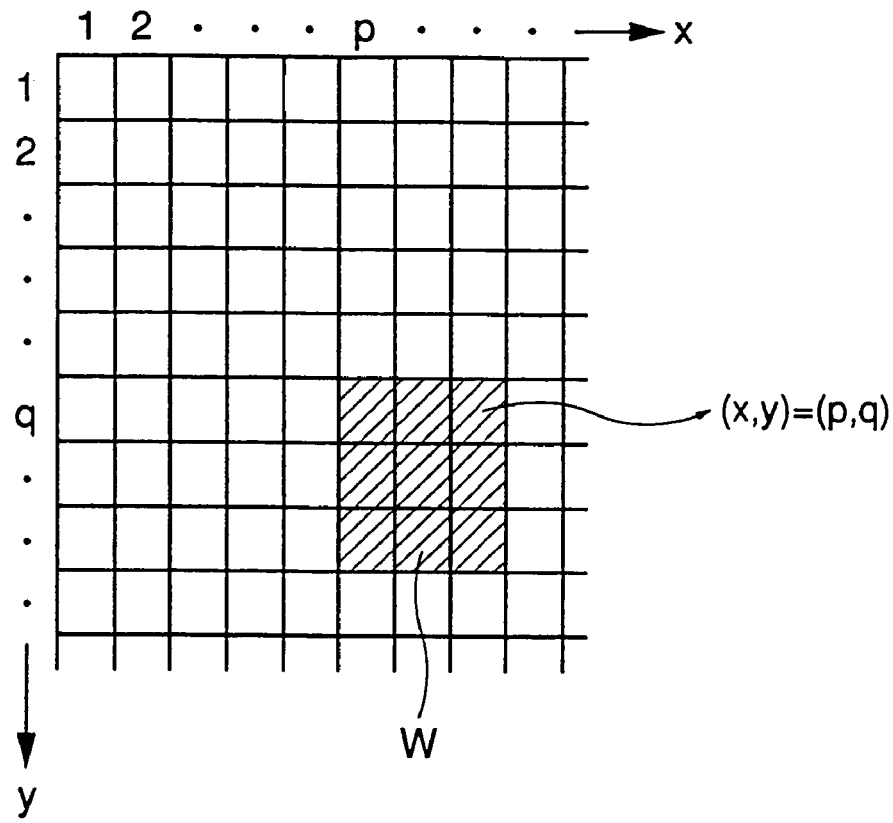
FIGS. 2A and 2B are diagrams illustrating the calculation performed to determine the activity of a block.

The block activity is calculated in the following manner. First, for each region (hereafter "local region") consisting of 3×3 pixels within a block, the average (hereafter "local average") of data is calculated. Here, x and y represent the position of the local region within the block (see FIGS. 2A and 2B). FIG. 2B shows the data of the nine pixels existing in the hatched area W shown in FIG. 2A. Next, for each local region, the average $\sigma^2 d(x, y)$ (hereafter "local activity") of the squares of the deviations of the data of the individual pixels from the local average is calculated. Then, the average of the local activity $\sigma^2 d(x, y)$ of the individual local regions is calculated as the block activity $\sigma^2 d[b_n]$. Thus, the block activity $\sigma^2 d[b_n]$ is calculated by formula (1) below.

$$\sigma^2 d[b_n] = (1/16^2) \sum_{X=0}^{15} \sum_{Y=0}^{15} \sigma^2 d(x, y) \quad (1)$$

where $$\sigma^2 d(x, y) = (1/9) \sum_{i=-1}^{1} \sum_{j=-1}^{1} \{d_{xy}(i, j) - \langle d(x, y) \rangle\}^2$$

$$\langle d(x, y) \rangle = (1/9) \sum_{i=-1}^{1} \sum_{j=-1}^{1} d_{xy}(i, j)$$

Note that, as will be described later, the calculated block activity $\sigma^2 d[b_n]$ is used to switch, block by block, the code book used in vector quantization.

Figure 3:
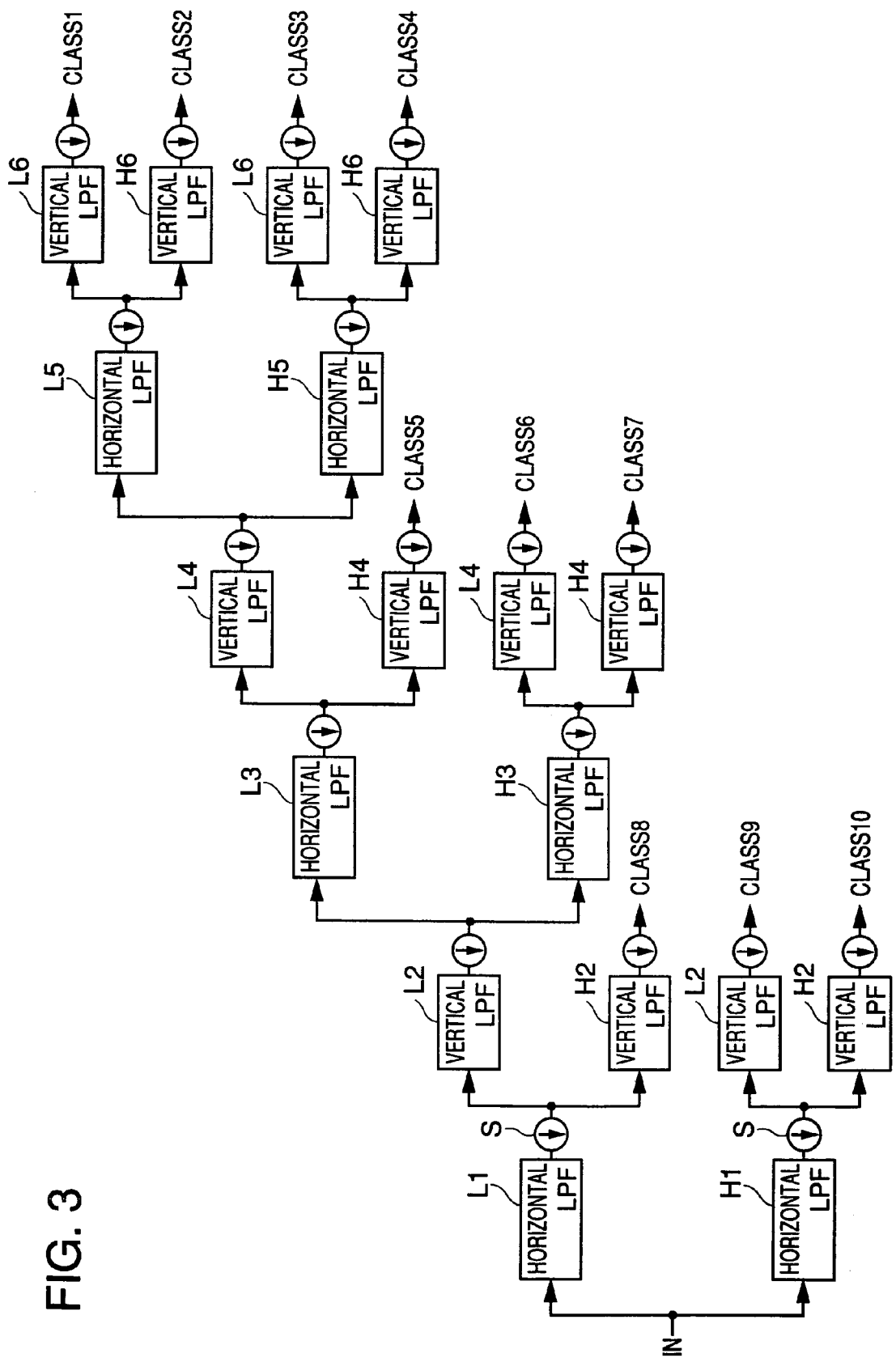
FIG. 3 is a diagram illustrating the calculation performed in the QMF.

The luminance data divided into blocks are then further divided into a plurality of frequency ranges by the QMF 2. FIG. 3 illustrates the operation performed by the QMF 2. First, the luminance data divided into blocks is filtered by a horizontal low-pass filter L1 and a horizontal high-pass filter L2 so as to be divided horizontally into two equally wide frequency ranges. Next, the two frequency ranges thus obtained by horizontal division are each filtered by a vertical low-pass filter L2 and a vertical high-pass filter H2 so as to be divided vertically into two equally wide frequency ranges.

Through the filtering operations performed thus far, the luminance data divided into blocks is divided into four frequency ranges, i.e. a both horizontally and vertically low frequency range, a horizontally low and vertically high frequency range, a horizontally high and vertically low frequency range, and a both horizontally and vertically high frequency range.

Then, for the both horizontally and vertically low frequency range, the same filtering operations as described above are performed, and then again, for the both horizontally and vertically low frequency range thereby obtained, the same filtering operations as described above are performed, and so forth. In the embodiment under discussion, image data is divided into blocks each consisting of 16×16 pixels, and therefore the filtering operations described above are performed three times in total. As a result, as shown in FIG. 4, each block is divided into ten frequency ranges labeled class 1 to class 10, respectively.

Figure 4:
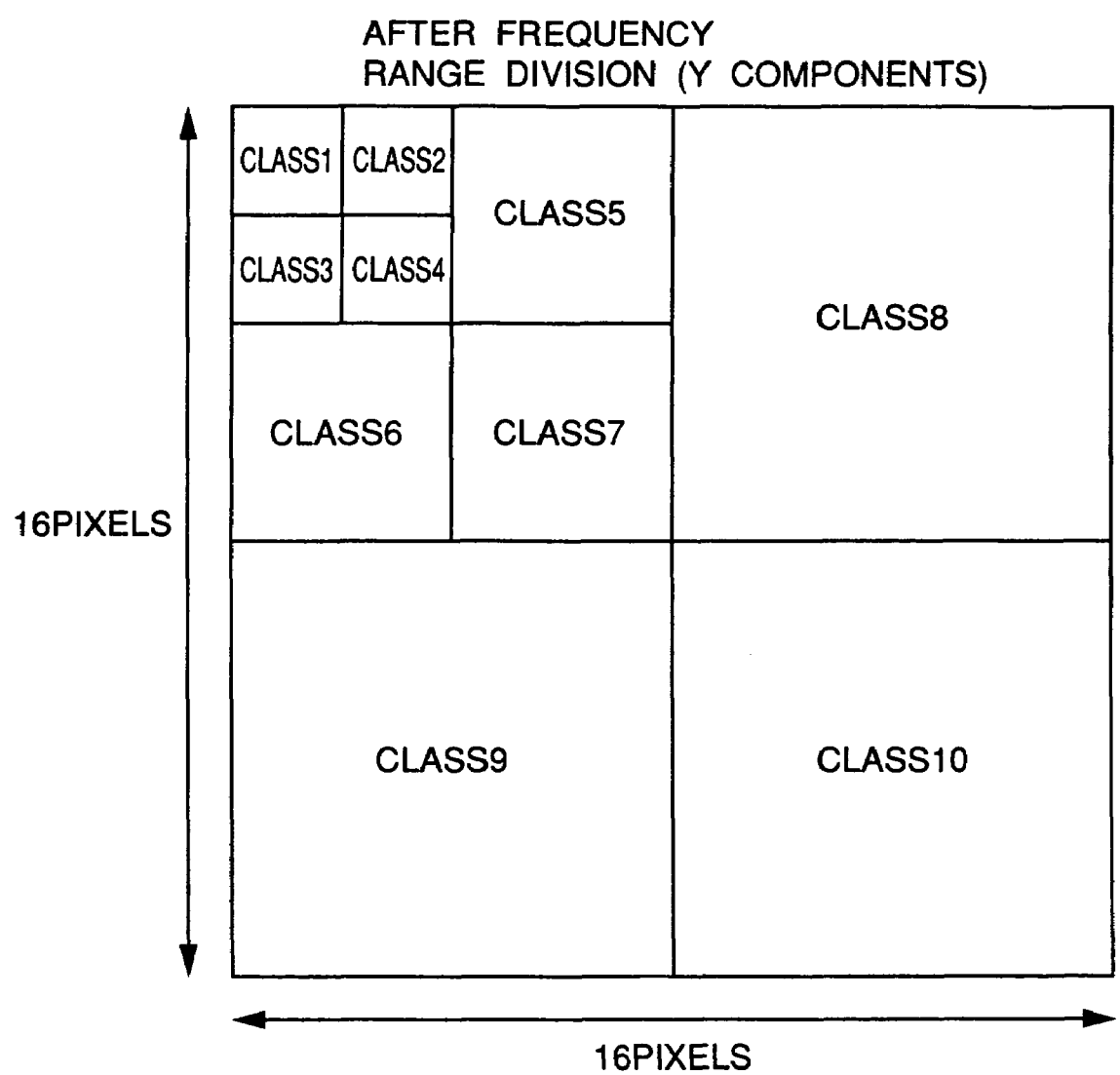
FIG. 4 is a diagram showing the allocation of data (luminance components) after being subjected to the calculation performed by the QMF.

In FIG. 4, the closer a class is to the left-hand side, the lower its frequency range is horizontally, and the closer a class is to the top side, the lower its frequency range is vertically. Thus, class 1 is the lowest frequency range, and class 10 is the highest frequency range. Division of a frequency range increases the number of pieces of data. Therefore, every time a frequency range is divided, the data is thinned out by a sub-sampler S to reduce the number of pieces of data.

In this way, the QMF 2 converts data distributed along a time axis into data distributed along a frequency axis. Thereafter, the compression circuit 5 compresses the data by methods appropriate for the individual frequency ranges, and then the Huffman coding circuit 8 performs Huffman coding on the sequence of data resulting from the compression.

Next, how the compression circuit 5 compresses the data by methods appropriate for the individual frequency ranges will be described. For class 1 shown in FIG. 4, DPCM is performed. Specifically, within class 1, for the data at the upper left-hand corner, the data is encoded intact; for the data at the left-hand end, the difference from the upper adjoining data is encoded; for the remaining data, the difference from the left-hand adjoining data is encoded.

Next, for classes 2 to 4, scalar quantization is performed. In the embodiment under discussion, scalar quantization is performed using different step numbers for different frequency ranges. Specifically, for example, a step number of 64 is used for classes 2 and 3, a step number of 32 is used for class 4, and so forth. That is, scalar quantization is performed with a greater step number for classes 2 and 3 that correspond to lower frequency ranges than for class 4 that corresponds to a higher frequency range.

This makes it possible to reduce quantization errors occurring in the lower frequency classes that are more conspicuous to the human eye among the classes that are to be subjected to the scalar quantization, and thereby reduce degradation of the decoded image. This can be achieved without unduly lowering the compression rate, because the step number is increased only for the lower frequency classes among the classes that are to be subjected to the scalar quantization.

Moreover, as shown in a scalar table given as Table 1, scalar quantization is performed, for data between −1023 to 1023 (though only positive data is listed in Table 1), with a greater step width according as the absolute value of data increases. However, for data exceeding a threshold value (in Table 1, 716), encoding is performed in such a way that no quantization errors are generated.

Specifically, when the absolute value of data exceeds 716, no quantization is performed, but the value of the data itself is used as a quantization representative value (hereafter, this will be described as data being passed "through"). Note that, in actual transfer of data, for example when the value of data is 720 (11011010000, where the "1" at the head represents "+"), the value of the data is appended after "11111", like "1111111011010000".

As a result, by appropriately setting the threshold value, it is possible to eliminate quantization errors for data that does not occur frequently, i.e. that is conspicuous in the screen, and thereby reduce deterioration of the decoded image. Although the code length of data exceeding the threshold value becomes longer, since data having a great absolute value does not occur frequently, this does not make the compression rate unduly low.

As described above, in this embodiment, scalar quantization is achieved by performing encoding in such a way that no quantization errors are generated when the absolute value of data exceeds the threshold value. Alternatively, it is also possible to perform quantization with the step width increased according as the value of data increases up to the threshold value and then decreased according as the value of data increases above the threshold value. This also helps reduce quantization errors for data having a great absolute value, and thereby achieve a similar effect, though the effect is weaker here because quantization errors, though small, do occur.

Figure 5:
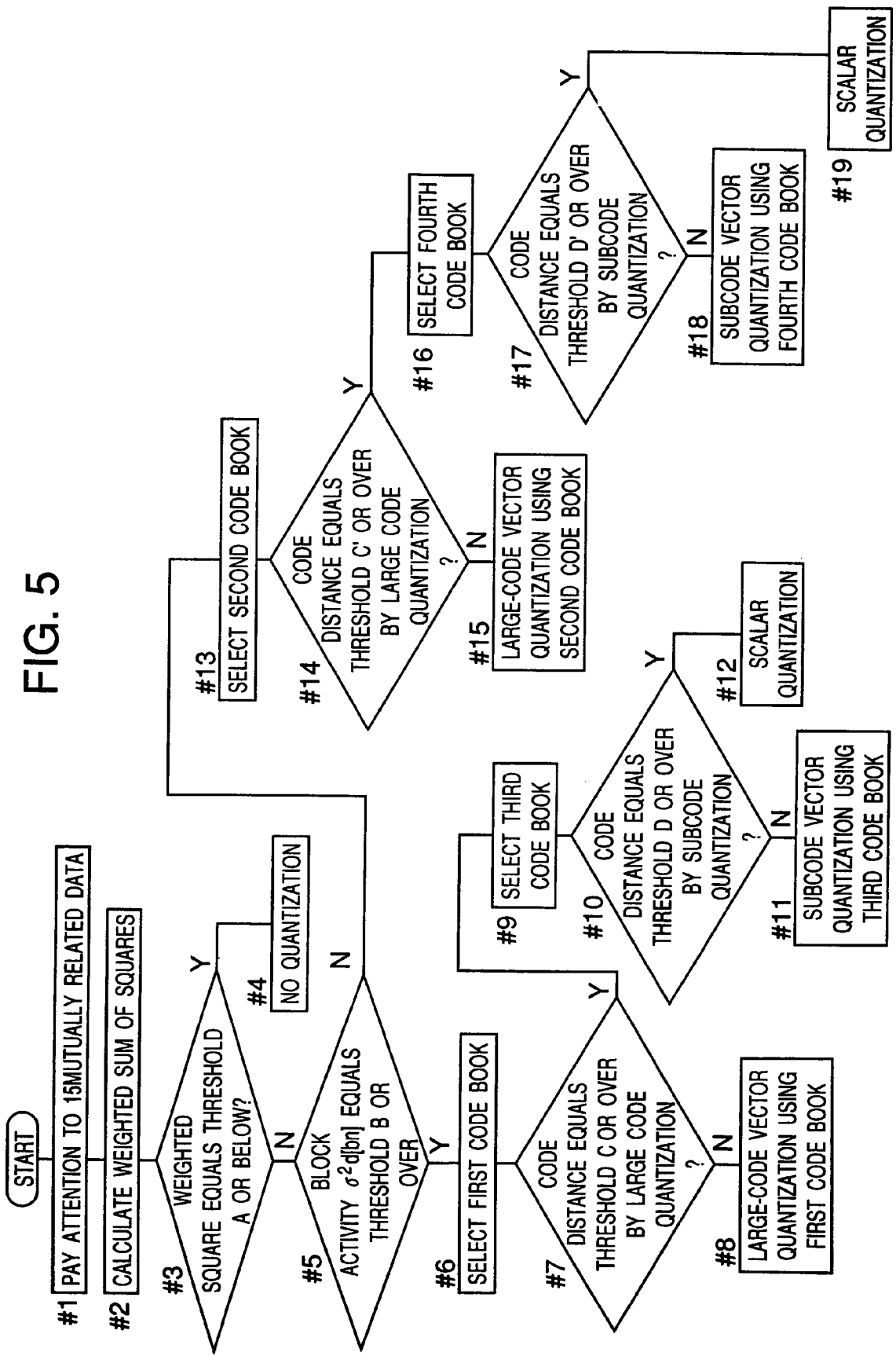
FIG. 5 is a flow chart showing the procedure followed to perform vector quantization in the embodiment of the invention.

Next, for classes 5 to 10, vector quantization is performed. Vector quantization is performed under the control of the vector quantization control circuit 6. The procedure for performing vector quantization will be described with reference to the flow chart shown in FIG. 5.

Figure 6:
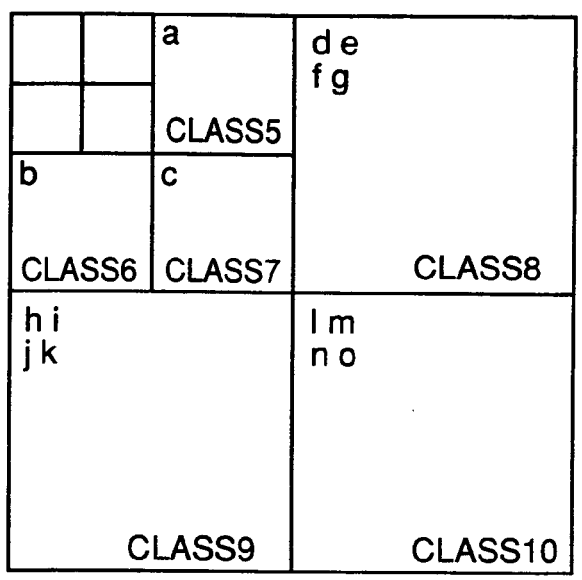
FIG. 6 is a diagram illustrating the units used to perform vector quantization in the embodiment of the invention.

First, out of the data included in classes 5 to 10, attention is paid to 15 mutually related pieces of data a to o (#1), as shown in FIG. 6. Next, with heavier weights given to lower frequency classes, i.e. with increasingly light weights given to the data a of class 5 and the data b of class 6, the data c of class 7, the data d to g of class 8 and the data h to k of class 9, and the data l to o of class 10 in this order, the sum of the squares of the 15 pieces of data a to o is calculated (#2). This calculation is performed by the sum-of-squares calculation circuit 4.

Next, whether the sum of squares calculated in #2 is equal to or smaller than a threshold value A or not is checked (#3). If the sum of squares calculated in #2 is equal to or smaller than the threshold value A (Y in #3), then vector quantization is not performed (#4). On the other hand, if the weighted sum of squares calculated in #2 is not equal to or smaller than the threshold value A (N in #3), then whether the block activity $\sigma^2 d[b_n]$ calculated by the block activity calculation circuit 3 is greater or smaller than a threshold value B is checked (#5).

If the block activity $\sigma^2 d[b_n]$ is greater than the threshold value B (Y in #5), then a first code book is selected (#6), and whether the code distance obtained when vector quantization is performed on all of the 15 mutually related pieces of data a to o included in classes 5 to 10 as a set (unit) is equal to or greater than a threshold value C or not is checked (#7).

If the code distance is not equal to or greater than the threshold value C, i.e. if quantization errors are not so great (N in #7), control operations are performed so that vector quantization is performed using the first code book and on the 15 mutually related pieces of data a to o included in classes 5 to 10 as a set (#8).

On the other hand, if the code distance is equal to or greater than the threshold value C, i.e. if quantization errors are great when vector quantization is performed on the 15 pieces of data a to o included in classes 5 to 10 as a set, a third code book is selected (#9), and whether the code distance obtained when vector quantization is performed individually on a set of five pieces of data a, d, e, f, and g included in classes 5 and 8, which are horizontally closely related, a set of five pieces of data b, h, i, j, and k included in classes 6 and 9, which are vertically closely related, and a set of five data c, l, m, n, and o included in classes 7 and 10, which are both horizontally and vertically closely related is equal to or greater than a threshold value D or not is checked (#10).

Note that, in the following descriptions, performing vector quantization on the 15 pieces of data included in classes 5 to 10 divided into 3 sets of data each consisting of five pieces of data will be referred to as subcode vector quantization, and performing vector quantization on the 15 pieces of data included in classes 5 to 10 as a set will be referred to as large-code vector quantization.

If the code distance is not equal to or greater than the threshold value D, i.e. if quantization errors are not so great even when subcode vector quantization is performed (N in #10), control operations are performed so that subcode vector quantization is performed using the third code book (#11). On the other hand, if the code distance is equal to or greater than the threshold value D, i.e. if quantization errors are great when subcode vector quantization is performed (Y in #10), control operations are performed so that scalar quantization is performed on the 15 pieces of data included in classes 5 to 10 (#12).

If the block activity $\sigma^2 d[b_n]$ is smaller than the threshold value B (N in #5), the same operations as performed in steps #6 to #12 are performed using a second and a fourth code book instead of the first and third code books (#13 to #19). The operations described thus far are performed for each of sets of 15 mutually related pieces of data included in classes 5 to 10.

In this way, whether to perform vector quantization or not is switched according to the weighted sum of the squares of the data in the frequency ranges that are to be subjected to vector quantization. Moreover, the code book used is switched according to the block activity. Furthermore, depending on the code distance, subcode vector quantization is performed (i.e. the number of pieces of data constituting a unit of vector quantization is reduced), and, if the code distance is long even when subcode vector quantization is performed, scalar quantization is performed. Thus, it is possible to perform quantization in a manner appropriate for the type of the image without unduly lowering the compression rate, and thereby reduce degradation of the decoded image.

In this embodiment, two code books are prepared for large-code vector quantization, and two code books are prepared for subcode vector quantization. However, it is also possible to prepare three or more code books for each type of vector quantization and switch among them according to the block activity and the code distance in a manner as described above. This allows vector quantization to be performed in a manner more appropriate for the type of the image, and thereby reduce degradation of the decoded image with a smaller loss in the compression rate.

In this embodiment, the code book used in vector quantization is switched according to the relation between the block activity and the threshold value B. However, it is also possible to determine the average (hereafter "frame activity") of the block activity of the individual blocks constituting a frame and vary the threshold value B according to the frame activity. This allows vector quantization to be performed using a code book more appropriate for the type of the image, and thereby reduce degradation of the decoded image.

Figure 7:
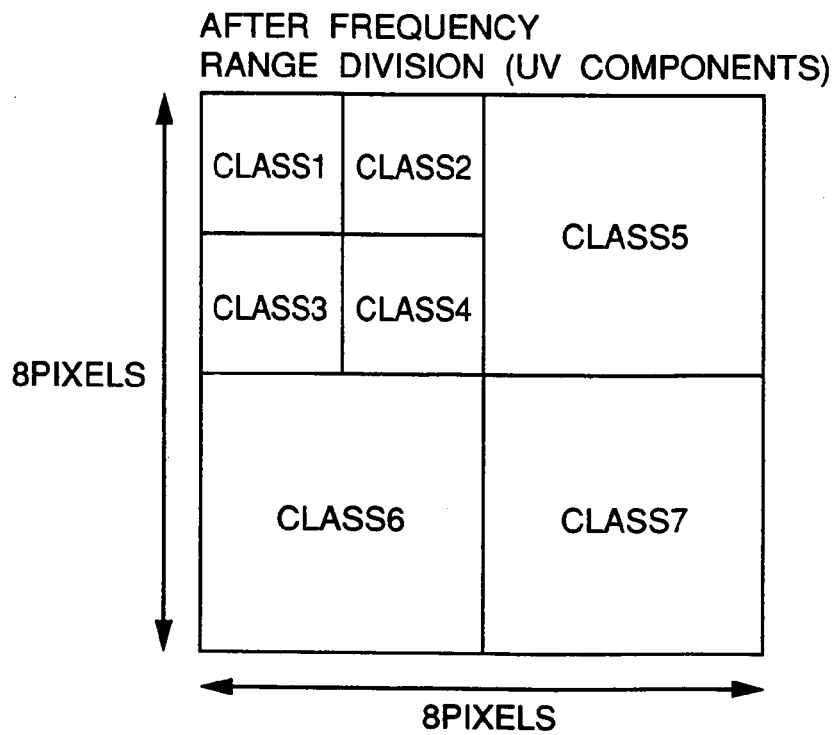
FIG. 7 is a diagram showing the allocation of data (chrominance components) after being subjected to the calculation performed by the QMF.

The descriptions given thus far deal only with the luminance data of an image. The chrominance data (i.e. UV components) is processed in the following manner, on the basis of the fact that the human eye is less sensitive to degradation of chrominance components than to degradation of luminance components. First, the chrominance data is divided into blocks each consisting of 8×8 pixels to calculate the block activity as with the luminance data, and is then converted into data distributed along a frequency axis by a QMF so as to be divided into seven frequency ranges called classes 1 to 7, respectively, as shown in FIG. 7. Then, compression is performed by DPCM for class 1 and by vector quantization for classes 2 to 7, and the sequence of data resulting from the compression is subjected to Huffman coding. The procedure for vector quantization is the same as with the luminance data.

In this way, for the chrominance components, on the basis of the fact that the human eye is less sensitive thereto, encoding is performed only by DPCM and vector quantization. This makes it possible to minimize degradation of the decoded image and perform data compression efficiently.

Now, the configuration of the QMF 2 serving as a frequency range dividing filter will be described. The QMF 2 is basically a FIR (non-recursive digital filter), but is designed to require fewer multipliers and thus a smaller circuit scale. How the number of multipliers is reduced will be described below.

Now, consider a case where the factors (in decimal notation) by which the outputs of the individual flip-flops (delay circuits) $FF_1$, $FF_2$, ... constituting the FIR are to be multiplied are as listed in Table 2. Take the maximum value 489061 among those factors, and the value obtained by shifting it (as represented in binary notation) one bit rightward will be represented by 1R, the value obtained by shifting it two bits rightward will be represented by 2R, and so forth (hereafter, such representations will be referred to as "shift representations"). Then, the other factors can be approximated by performing addition and subtraction among appropriate shift representations as shown in Table 2. The values as represented in decimal notation obtained by performing shift operations on the factor 489061 as represented in binary notation is listed in Table 3.

On the basis of the fact that a factor can be represented by shift representations of other factors, for example, the factor 15276 can be approximated as 5R−16R+20R by the use of shift representations, and therefore the result of multiplying a binary number X by a factor 15276 can be determined by calculating [(X shifted 5 bits rightward)−(X shifted 16 bits rightward)+(X shifted 20 bits rightward)]×(489061 as represented in binary notation).

Figure 8:
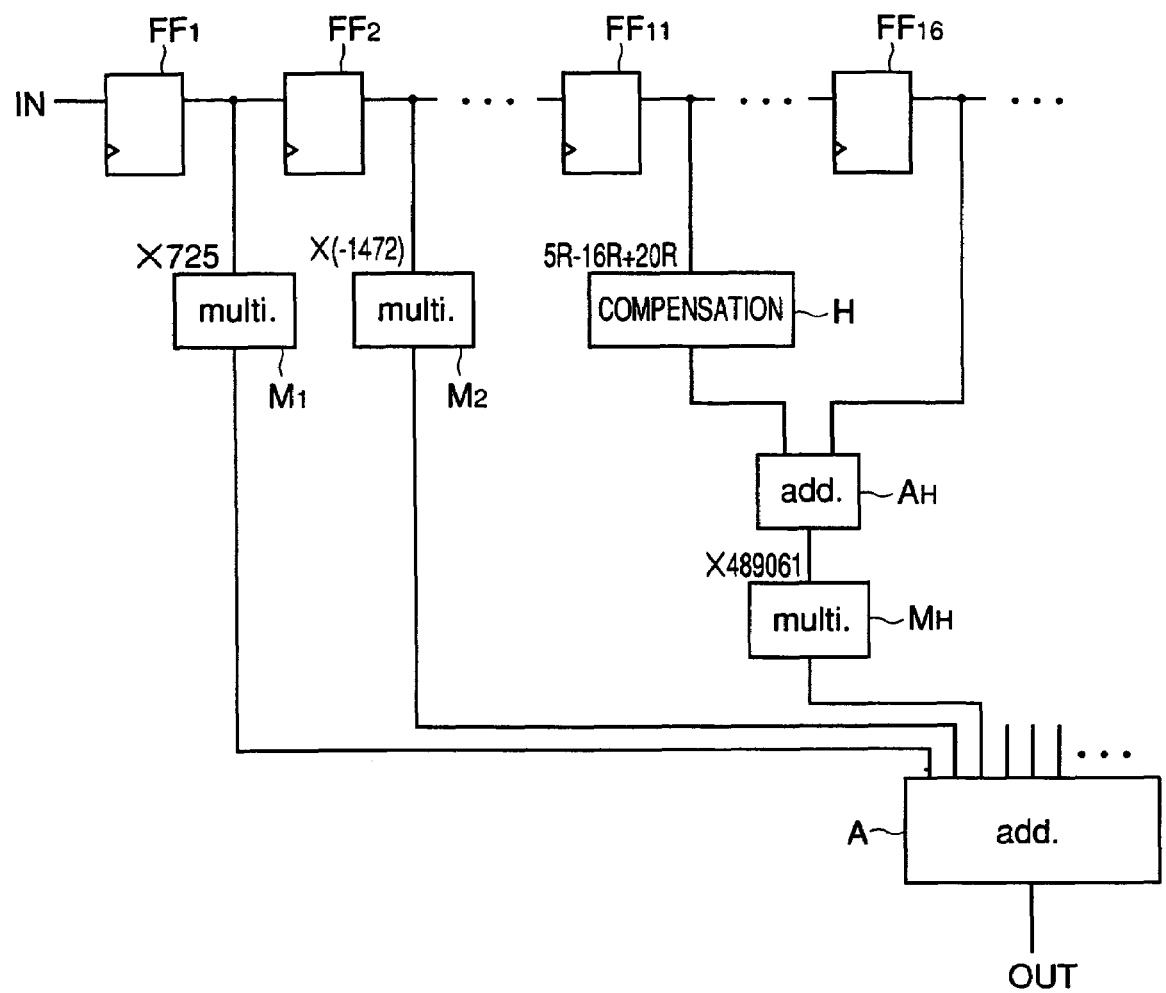
FIG. 8 is a diagram showing the configuration of a FIR (non-recursive digital filter) according to the invention.
Figure 9:
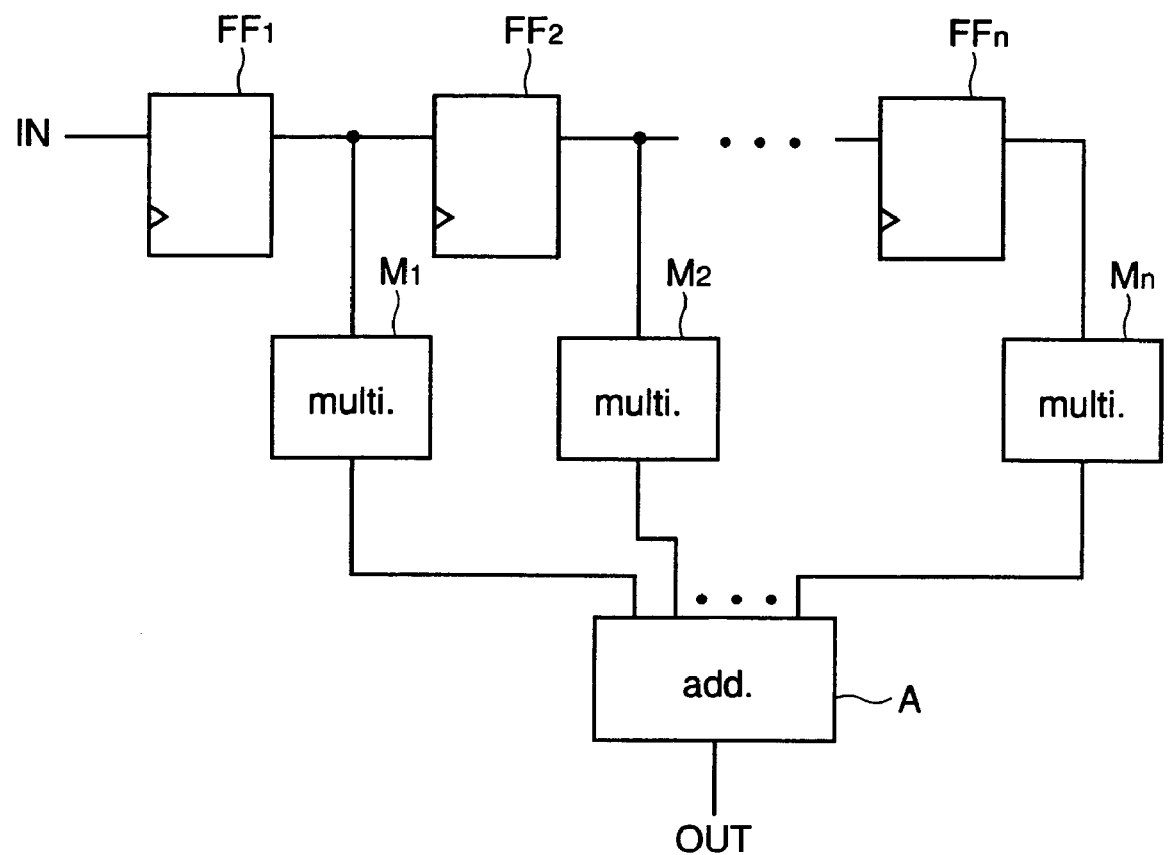
FIG. 9 is a diagram showing the configuration of a conventional FIR (non-recursive digital filter).

Accordingly, as shown in FIG. 8, instead of a multiplier provided conventionally, it is possible to provide a circuit H (hereafter "compensation calculator) that performs, on the output of the flip-flop $FF_{11}$, shift operations 5R, 16R, and 20R of the individual terms of the approximated value (5R−16R+20R) of the factor 15276, by which to multiply the output of the flip-flop $FF_{11}$, as represented by the use of shift representations and that performs addition and subtraction on the values obtained by those shift operations in accordance with the approximated value as represented by the use of shift representations. Then, by adding the output of the flip-flop $FF_{16}$, which is going to be multiplied by the maximum factor 489061, and the output of the compensation calculator H by the use of an adder $A_H$, and then multiplying the result by the maximum factor 489061 by the use of a multiplier $M_H$, it is possible to reduce the number of multipliers, of which two are required conventionally, to one. Thus, although it is necessary to provide a compensation calculator H and an adder $A_H$ separately, it is possible to reduce the circuit scale.

In this embodiment, for the factors other than the factor 15276, multipliers are used as are used conventionally. This is because, for the other factors, there are too many terms to be processed by addition and subtraction in the approximated value as represented by the use of shift representations, and thus the use of a compensation calculator as mentioned above rather makes the circuit scale larger. Thus, whether to use a multiplier or a compensation calculator needs to be determined according to the number of terms to be processed by addition and subtraction in the approximated value of a factor as represented by the use of shift representations.

In this embodiment, the maximum factor is used to derive shift representations that are processed by addition and subtraction to approximate the other factors. However, it is also possible to use, instead of the maximum factor, an arbitrary factor to derive shift representations that are processed by addition and subtraction to approximate the other factors. However, using shift representations derived from the maximum or minimum factor is more efficient because then shifting needs to be performed only in one direction, either rightward or leftward. It is also possible to select a factor from which shift representations can be derived in such a way that as many factors as possible can be represented by the use of as few terms as possible in approximated values as represented by the use of shift representations.

Moreover, in this embodiment, input image data is processed block by block (specifically, 16×16-pixel blocks for the luminance data and 8×8-pixel blocks for the chrominance data). However, it is also possible to process the data frame by frame (screen by screen) without dividing the data into blocks, though this requires larger-scale hardware. It is known that block-by-block and frame-by-frame processing yields similar results.

Moreover, in an image processing apparatus that compresses image data to record or communicate it, adopting the wavelet-based encoding method of the embodiment described above as a data compression method helps reduce degradation of the decoded image data without unduly lowering the compression rate and thereby offer higher image quality without unduly increasing the scale and cost of hardware.

TABLE 1

| STEP NUMBER 64 | | STEP NUMBER 32 | |
|---|---|---|---|
| QUANTIZATION REPRESENTATIVE VALUE | DATA | QUANTIZATION REPRESENTATIVE VALUE | DATA |
| 0 | 0~3 | 0 | 0~3 |
| 8 | 4~11 | 8 | 4~11 |
| 16 | 12~19 | 16 | 12~19 |
| 24 | 20~27 | 24 | 20~27 |
| 32 | 28~35 | 32 | 28~35 |
| 40 | 36~43 | 44 | 36~51 |
| 48 | 44~51 | 64 | 52~75 |
| 56 | 52~59 | 92 | 76~107 |
| 64 | 60~67 | 124 | 108~139 |
| 72 | 68~75 | 160 | 140~179 |
| 80 | 76~83 | 208 | 180~235 |
| 88 | 84~91 | 268 | 236~299 |
| 96 | 92~99 | 340 | 300~379 |
| 112 | 100~123 | 428 | 380~475 |
| 136 | 124~147 | 532 | 476~587 |
| 160 | 148~171 | 652 | 588~715 |
| 184 | 172~195 | THROUGH | 716 AND OVER (~1023) |
| 208 | 196~219 | | |
| 232 | 220~243 | | |
| 256 | 244~267 | | |
| 280 | 268~291 | | |
| 304 | 292~315 | | |
| 336 | 316~355 | | |
| 376 | 356~395 | | |
| 416 | 396~435 | | |
| 456 | 436~475 | | |
| 496 | 476~515 | | |
| 536 | 515~555 | | |
| 576 | 556~595 | | |
| 616 | 596~635 | | |
| 656 | 636~675 | | |
| 696 | 676~715 | | |
| THROUGH | 716 AND OVER (~1023) | | |

TABLE 2

| FACTOR | VALUE APPROXIMATED BY SHIFT REPRESENTATION |
|---|---|
| 725 | 9R − 11R + 16R + 19R |
| −1472 | −8R + 10R − 14R − 16R − 18R |
| −1330 | −9R − 10R + 12R − 15R − 18R |
| 4440 | 7R + 10R + 12R + 15R + 16R |
| 1483 | 8R − 10R + 13R − 16R − 18R |
| −9918 | −6R − 8R − 10R + 12R − 16R − 20R |
| −137 | −12R − 15R − 18R − 19R |
| 18855 | 5R + 7R − 11R − 16R − 18R − 19R |
| −4391 | −7R − 10R − 12R + 14R − 17R + 20R |
| −32756 | −4R − 8R − 11R − 14R − 16R − 17R + 20R |
| 15276 | 5R − 16R + 20R |
| 55519 | 3R − 6R + 8R + 12R − 18R |
| 41260 | −4R − 6R − 7R + 9R − 11R + 13R − 16R |
| −102786 | −2R + 5R + 7R + 10R − 12R + 15R + 17R − 18R |
| 134802 | 2R + 5R − 8R − 9R + 12R |
| 489061 | 0R |

TABLE 3

VALUES OBTAINED BY SHIFT OPERATION ON 489061 REPRESENTED IN BINARY NOTATION

| SHIFT NUMBER | DECIMAL NOTATIN |
|---|---|
| 1R | 244530.5 |
| 2R | 122265.25 |
| 3R | 61132.625 |
| 4R | 30566.3125 |

TABLE 3-continued

VALUES OBTAINED BY SHIFT OPERATION ON 489061 REPRESENTED IN BINARY NOTATION

| SHIFT NUMBER | DECIMAL NOTATIN |
|---|---|
| 5R | 15283.15625 |
| 6R | 7641.578125 |
| 7R | 3820.7890625 |
| 8R | 1910.39453125 |
| 9R | 955.197265625 |
| 10R | 477.5986328125 |
| 11R | 238.79931640625 |
| 12R | 119.399658293125 |
| 13R | 59.6998291015625 |
| 14R | 29.84991455078125 |
| 15R | 14.924957275390625 |
| 16R | 7.4624786376953125 |
| 17R | 3.73123931884765625 |
| 18R | 1.865619659423828125 |
| 19R | 0.9328098297119140625 |
| 20R | 0.46640491485595703125 |

What is claimed is:

1. A wavelet-based encoding method that converts input data, distributed along a time axis, into data distributed along a frequency axis by using a frequency range dividing filter and that compresses the data distributed along the frequency axis by using methods corresponding to individual frequency ranges, wherein data in a particular frequency range along the frequency axis is compressed by performing vector quantization using a code book selected from among a plurality of code books according to activity of the input data.

2. A wavelet-based encoding method as claimed in claim 1, wherein, for each of local regions each composed of a plurality of pieces of the input data, a local average value is calculated by calculating an average value of those pieces of data, then local activity is calculated by calculating an average of squares of deviations of those pieces of data from the local average, and then the activity of the input data is calculated by calculating an average of the local activity of all of the local regions.

3. A wavelet-based encoding device that converts input data, distributed along a time axis, into data distributed along a frequency axis by using a frequency range dividing filter and that compresses the data distributed along the frequency axis by using methods corresponding to individual frequency ranges, wherein the frequency range dividing filter is composed of a plurality of non-recursive digital filters and performs a multiplication operation by exploiting a fact that a value is approximated by adding or subtracting a value obtained by shifting digits of another value.

4. A wavelet-based encoding device that converts input data, distributed along a time axis, into data distributed along a frequency axis by using a frequency range dividing filter and that compresses the data distributed along the frequency axis by using methods corresponding to individual frequency ranges, wherein data in a particular frequency range along the frequency axis is compressed by performing vector quantization using a code book selected from among a plurality of code books according to activity of the input data.

5. A wavelet-based encoding device as claimed in claim 4, wherein, for each of local regions each composed of a plurality of pieces of the input data, a local average value is calculated by calculating an average value of those pieces of data, then local activity is calculated by calculating an average of squares of deviations of those pieces of data from the local average, and then the activity of the input data is calculated by calculating an average of the local activity of all of the local regions.

6. An image processing apparatus for recording or communicating image data by converting the image data, distributed along a time axis, into data distributed along a frequency axis by using a frequency range dividing filter and then compressing the data distributed along the frequency axis by using methods corresponding to individual frequency ranges, wherein data in a particular frequency range along the frequency axis is compressed by performing vector quantization using a code book selected from among a plurality of code books according to activity of the image data.

7. An image processing apparatus as claimed in claim 6, wherein, for each of local regions each composed of a plurality of pieces of the image data, a local average value is calculated by calculating an average value of those pieces of data, then local activity is calculated by calculating an average of squares of deviations of those pieces of data from the local average, and then the activity of the image data is calculated by calculating an average of the local activity of all of the local regions.

8. An image processing apparatus for recording or communicating image data by converting the image data, distributed along a time axis, into data distributed along a frequency axis by using a frequency range dividing filter and then compressing the data distributed along the frequency axis by using methods corresponding to individual frequency ranges, wherein data compression is achieved by performing predictive coding for a low frequency range, performing scalar quantization for a plurality of frequency ranges between the low frequency range and a high frequency range with step numbers varied from one frequency range to another, and performing vector quantization for the high frequency range using one among a plurality of code books according to activity of the image data.

* * * * *